United States Patent Office 3,792,122
Patented Feb. 12, 1974

3,792,122
POLYPHENYLENE ETHER RESINS CONTAINING A BUTADIENE-ACRYLIC-STYRENE POLYMER MODIFIER
Harry C. Fromuth, Jr., Trevose, Pa., assignor to Rohm and Haas Company, Philadelphia, Pa.
No Drawing. Continuation-in-part of application Ser. No. 859,191, Sept. 18, 1969. This application Apr. 21, 1971, Ser. No. 136,196
Int. Cl. C08f 41/12
U.S. Cl. 260—876 R    5 Claims

ABSTRACT OF THE DISCLOSURE

Polyphenylene ether resins are modified by a mulitple-stage sequentially-produced polymer comprising a first stage polymerized from a monomer mixture comprising at least 40 weight percent butadiene and a final stage polymerized in the presence of a product containing the first stage from a monomer mixture comprising a member selected from the group consisting of alkyl methacrylates, alicyclic methacrylates, alkyl acrylates and mixtures of the foregoing.

THE DISCLOSURE

This application is a continuation-in-part of Fromuth, United States patent application S.N. 859,191, filed September 18, 1969 now abandoned.

This invention relates to a thermoplastic composition comprising a multi-stage acrylic impact modifier derived from butadiene or butadiene/styrene blended with polyphenylene ether resins.

Polyphenylene ether resins are known and described in numerous publications such as U.S. Pat. Nos. 3,306,874, 3,306,875, 3,257,357 and 3,257,358. These high molecular weight polymers are high performance engineering thermoplastics possessing relatively high melt viscosities and softening points. The resins are useful for many commercial applications where high temperature resistance is required such as in films, fibers and molded articles.

Various modifiers have been intermixed with the polyphenylene ether resins to reduce cost and to improve processing characteristics. The modifiers that may be intermixed with the polyphenylene ether resins include styrene polymers. These styrene polymers have at least 25 percent, by weight, polymer units derived from a compound having the formula:

I

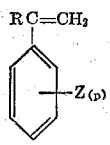

$RC=CH_2$ $Z_{(p)}$ where R is hydrogen, lower alkyl or halogen, Z is a member selected from the class consisting of vinyl, hydrogen, chlorine and lower alkyl; and p is a whole number equal to from 0 to 5. The term "styrene polymer" as used throughout this disclosure and in the claims, and as defined by the above Formula I includes, by way of example, homopolymers such as polystyrene and polychlorostyrene, modified polystyrenes such as rubber modified polystyrenes, and styrene containing copolymers such as the styreneacrylonitrile copolymers (SAN), styrene-butadiene copolymers, styrene-acrylonitrile-α-alkyl styrene copolymers, styrene-acrylonitrile-butadiene copolymers (ABS), poly-α-methylstyrene, and the like. The preferred styrene polymers are the homopolymer of styrene, high impact polystyrenes, ABS copolymers and SAN copolymers.

For the purposes of this invention, the term polyphenylene ether resin will refer to the polyphenylene ethers alone or in admixture with the styrene polymers described above. Typically, these polyphenylene ether resins contain from 40 to 85 percent polyphenylene ether and from 60 to 15 percent styrene polymer to obtain the best balance of physical characteristics.

Polyphenylene ether resins have deficiencies that limit their utility as molding compositions. In particular, the impact strength is low by comparison with high impact plastics. Furthermore, processing characteristics cause great difficulties in the molding of critically shaped parts. Further, in some aspects polyphenylene ether resins containing high quantities of styrene polymers have inferior physical characteristics making their acceptance limited. In particular, these resins have poor physical appearance and mechanical properties, particularly as compared to the polyphenylene ethers without styrene polymer modifiers.

The present invention provides a means of upgrading the physical properties of polyphenylene ether resins. In particular, by means of the persent invention, processing characteristics of molding compositions of polyphenylene ether resins are improved. The resins may be processed at lower molding temperatures and pressures. Additionally, in one aspect of the present invention impact strength of the polyphenylene ether resin is substantially improved.

The present invention is a molding composition comprising 95 to 70, preferably 90 to 75 weight percent of a polyphenylene ether resin and 5 to 30, preferably 10 to 25 percent by weight of a multiple-stage, sequentially-produced polymer comprising; a first stage polymerized from a monomer mixture comprising at least 40 weight percent butadiene and a final stage polymerized in the presence of a product containing the first stage from a monomer mixture comprising a member selected from the group consisting of alkyl methacrylates, alicyclic methacrylates, alkyl acrylates and mixtures of the foregoing. It has been found that these described compositions are characterized by improved processing properties.

The multiple-stage, sequentially-produced polymers useful in this invention are known materials, or are members of known classes of material, and may be prepared by known techniques, such as by emulsion or suspension polymerization. Representative modifiers are formed from a butadiene or styrene-butadiene copolymer latex and a monomeric material solely or preponderantly of methyl methacrylate. For example, in the preparation of a representative modifier, 80 to 10 percent by weight of monomeric methyl methacrylate or monomeric methyl methacrylate to the extent of at least 55 percent and preferably as much as 75 percent by weight in admixture with another ethylenically unsaturated monomer which copolymerizes therewith, such as ethyl acrylate, acrylonitrile, vinylidene chloride, styrene, and similar unsaturated compounds containing a single vinylidene group, is added to 20 to 90 percent by weight solids of a styrene-butadiene copolymer latex. The copolymer solids in the latex comprise about 10 to 50 percent by weight of styrene and about 90 to 50 percent by weight of butadiene and the molecular weight thereof is within the range of about 25,000 to 1,500,000. The copolymer latex of solids in water contains a dispersing agent such as sodium oleate or the like to maintain the copolymer in suspension. Polymerization of the monomer or monomeric mixture with the copolymer solids suspended in water is brought about in the presence of a free-radical generating catalyst and a polymerization regulator which serves as a chain transfer agent, at a temperature of the order of 15° C. to 80° C. Coagulation of the interpolymerized product is then effected, for instance, with a calcium chloride solution whereupon it is filtered, washed and dried.

The preferred composition of this invention is a molding composition comprising 95 to 70 weight percent of a polyphenylene ether resin and 5 to 30 percent by weight of a multistage, sequentially-produced polymer comprising; a first stage polymerized from a monomer mixture comprising at least 40 weight percent butadiene and a final stage polymerized in the presence of a product containing the first stage from a monomer mixture comprising a member selected from the group consisting of alkyl methacrylates, alicyclic methacrylates, alkyl acrylates and mixtures of the foregoing; the multistage, sequentially-produced polymer additionally characterized in that at least one stage after the first stage is polymerized from a mixture comprising styrene.

It may be said that as a general proposition, modifiers that improve the impact resistance of thermoplastic compositions adversely affect processability. It has surprisingly been found that the compositions of the present invention containing at least one stage derived from a monomer mixture containing styrene not only substantially improve impact resistance but also increase the service temperature of the base polyphenylene oxide resins. It is thought, although applicants do not intend to be bound by this explanation, that the presence of stages derived from styrene impart that degree of compatibility between the sequentially-produced polymer and the polyphenylene ether resin necessary for forming an impact resistant composition.

Where B is butadiene, S is styrene, MMA is methyl methacrylate, EA is ethyl acrylate, X is a copolymerizable ethylenically unsaturated monomer as that term is known in the art, / separates the monomers making up a single stage and // indicates separate stages, examples of sequentially-produced, multistage polymers preferred in the present invention may be represented as follows:

B/S/MMA//S//MMA;

B/S/MMA//S//MMA/EA;

B/S//S/X//MMA;

B/S//S/MMA;

B/S//S/MMA/X;

and

B/S//S/MMA/EA.

The most preferred composition of this invention is a molding composition comprising 95 to 70 weight percent of a polyphenylene ether resin and 5 to 30 percent by weight of a multistage, sequentially-produced polymer comprising; 20 to 80 weight percent of a first stage polymerized from a monomer mixture comprising at least 40 weight percent butadiene; 10 to 40 weight percent of a second stage polymerized in the presence of the first stage from a monomer mixture comprising styrene, and 10 to 40 weight percent of a final stage polymerized in the presence of the product of the first and second stages from a monomer mixture selected from the group consisting of alkyl methacrylates, alicyclic methacrylates, alkyl acrylates and mixtures of the foregoing.

The second stage of the most preferred composition may be polymerized from a monomer mixture comprising styrene or a substituted styrene. This stage is polymerized under conditions such that the product will attach through graft polymerization with the first stage elastomeric latex. After the second stage is essentially fully polymerized onto the latex the final stage monomer mixture is polymerized to attach to the particles of the earlier stages. Although not essential it is preferred that the critical micelle level be controlled such that no new particles are formed after the elastomer latex is formed. Thus the latter stage monomer mixtures are polymerized so as to attach to and graft polymerize with the particles formed in the earlier stages.

The second stage monomer mixture commonly contains at least 50% styrene units with the remaining units aromatic, in particular substituted styrene units. Typical of the substituted styrenes useful in preparing this second stage are α-methyl styrene, chlorostyrene, vinyl toluene, tertiary-butyl styrene and the like.

The final stage monomer mixture that is graft polymerized onto the first stage back-bone polymer or product containing the first stage polymer is predominantly composed of alkyl methacrylate units. Preferably these alkyl methacrylates contain 1 to 4 carbon atoms in the alkyl group which may be branched or unbranched. Typical lower alkyl methacrylates include methyl methacrylate, ethyl methacrylate, and isobutyl methacrylate. Preferred final stage monomer mixtures contain at least 75% methyl methacrylate and 25% of another ethylenically unsaturated monomer. The final stage monomer mixture may contain an alkyl acrylate, preferably wherein the alkyl groups contain 1 to 8 carbon atoms. Typical of these acrylates are methyl, ethyl, n-butyl, and 2-ethylhexyl acrylates. The third stage mixture may contain alicyclic methacrylates. Preferably the alicyclic group is of 6 to 9 carbon atoms and may be bridged or unbridged. Typical of the alicyclic methacrylates are cyclohexyl, isobornyl methacrylates and the like.

The final stage monomer mixture commonly comprises 15 to 100 percent lower alkyl methacrylates, 0 to 25 percent alkyl acrylates, and 0 to 60 percent alicyclic methacrylates. Preferably the mixture comprises 85 to 98% alkyl methacrylates, wherein the alkyl group contains 1 to 4 carbon atoms, and 2 to 15% alkyl acrylates, wherein the alkyl group contains 1 to 8 carbon atoms.

The modifiers useful in this invention, as noted hereinabove, are produced by known techniques, for example, by emulsion polymerizing a subsequent stage mixture of monomers in the presence of a previously formed polymeric product. The polymerizations are carried out in the presence of a catalyst and a polymerization regulator which serves as a chain transfer agent at temperatures of the order of 15° C. to 80° C. Any of the well-known free-radical generating catalysts which polymerize methyl methacrylate per se may be used in the emulsion polymerization. Suitable catalysts are, for example, those of the organic peroxide type, such as methyl ethyl ketone peroxide and benzoyl peroxide, those of the hydroperoxide type, such as cumene hydroperoxide, those of the persulfate type, such as potassium persulfate, or catalysts such as azoisobutyronitrile. Thus, the usual water-soluble as well as the monomer-soluble types of catalysts may be employed. Amounts of catalyst used are normally of the order of .05 to .5 part by weight of monomer used. Catalysts of the water-soluble type may be added to the diluted copolymer latex before the monomer is added, while catalysts soluble in the monomer are usually added thereto prior to bringing the monomer into contact with the latex.

Polymerization regulators suitable for use in the process are those organic sulfur compounds such as thioacids, high molecular weight mercaptans such as benzyl mercaptan, aliphatic mercaptans having at least six carbon atoms per molecule such as octyl, dodecyl and tertiary dodecyl mercaptan, mixtures of mercaptans such as are obtained for example from lauryl alcohol, nitro hydrazines, amino compounds, carbon tetrachloride and similar well-known polymerization modifiers or regulators. Alkyl mercaptans of low water solubility such as n-dodecyl mercaptan or tertiary dodecyl mercaptan are preferred. Amounts of regulator added to control the rate of polymerization may be within the range of about .2 to 5% by weight of monomer used. Addition of the regulator to the monomer prior to admixing the latter with the latex is preferred.

In addition there may be added to the modifiers after polymerization, light stabilizers such as methyl or phenyl salicylate, oxidation inhibitors, such as hydroquinone or one of the amine type rubber antioxidants, fillers, coloring materials and the like as is well understood in the art. For additional information concerning useful modifiers, and for purposes of illustrating the background of this invention, see U.S. Pats. 2,857,360 and 2,943,074.

This invention is the use of an acrylic modifier to provide impact and/or processing characteristics heretofore unobtainable in polyphenylene ethers. The suitable polyphenylene ether resins may be described by the following repeating structural unit formula:

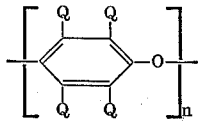

wherein the oxygen ether atom of one unit is connected to the benzene nucleus of the next adjoining unit, $n$ is a positive integer and is at least 100, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, hydrocarbonoxy radicals being free of a tertiary α-carbon atom, and halohydrocarbonoxy radicals having at least 2 carbon atoms between the halogen atom and phenyl nucleus and being free of a tertiary α-carbon atom. Examples of suitable polymers may be found in the above referenced patents.

The preferred polyphenylene ethers are those having alkyl substitution ortho to the oxygen ether atom and most preferably, ortho methyl substitution. These polymers are preferred because they combine with polystyrene to form fully compatible, homogeneous mixtures.

The method of blending the polyphenylene ether with the styrene resin is not critical and does not constitute a part of this invention. The preferred method comprises blending the two polymers in powder or granular form, extruding the blend, chopping into pellets and re-extruding.

To assist those skilled in the art to practice the present invention, the following modes of operation are suggested by way of illustration, parts and percentages being by weight unless otherwise specifically noted. The following abbreviations are used: styrene (S), 1,3-butadiene (B), methyl methacrylate (MMA), ethyl acrylate (EA), acrylonitrile (A) or (AN), / separates the monomers making up a single stage and // indicates separate stages.

EXAMPLE 1

Modifier A

A rubbery copolymer latex is prepared as described in U.S. Pat. 2,943,074. By weight, 70 parts of 1,3-butadiene, 30.0 parts styrene, 150.0 parts water, 5.0 parts sodium lauryl sulfate, 0.2 potassium persulfate, and 0.05 dodecyl mercaptan are mixed and polymerization is carried out by heating at 60° C. for 24 hours. Unreacted monomer is removed by degassing under vacuum.

By weight, 50.0 parts methyl methacrylate, 50.0 parts of the butadiene-styrene polymer product from the immediately preceding procedure, 150.0 parts of water, 3.75 parts sodium lauryl sulfate, 0.05 benzoyl peroxide and 0.22 dodecyl mercaptan are agitated together to form a stable emulsion. The emulsion is heated for 24 hours at 60° C. and the resulting product coagulated, washed and dried under vacuum. The product is indicated to be B/S//MMA; 35/15//50 and is designated Modifier A.

Modifier B

An acrylonitrile butadiene-styrene (ABS) modifier is prepared as follows: A poly(butadiene) latex, Firestone Rubber Company FRS 2004, containing 50 parts by weight of dry solids (as a 60% latex) is admixed with water (165 parts) containing sodium lauryl sulfate (1 part). The pH is adjusted to 4–5 by addition of 10% aqueous acetic acid, and the mixture is sparged with nitrogen. Sodium formaldehydesulfoxylate (0.2 part) is added. A mixture of styrene (35 parts), acrylonitrile (15 parts) and cumene hydroperoxide (0.3 part) is sparged with nitrogen and added to the stirred mixture during 2 hours at an initial temperature of 35° C. After the addition is complete, the temperature is raised from about 46° C. to 60° C., held at that temperature for 2 hours, then coagulated, washed and dried for use in Example 2. The product is indicated to be B//S/AN; 50//35/15 and is designated Modifier B.

Modifiers C and D

A rubbery copolymer latex is prepared by polymerizing the following mixture at 60° C. for 24 hours.

4 parts methyl methacrylate
78 parts butadiene-1,3
22 parts styrene
150 parts water
5.0 parts sodium lauryl sulfate
0.2 part potassium persulfate
0.05 part dodecyl mercaptan The latex is maintained as a stable emulsion while 30 parts styrene monomer is added with a suitable amount of a free radical catalyst. While controlling the critical micelle level the styrene is polymerized to attach to the latex to form a graft interpolymer. A charge of 33 parts methyl methacrylate is added to the emulsion and polymerized so as to attach to the graft interpolymer particles held in emulsion or suspension. The modifier is coagulated, washed and dried under vacuum. The replacement of the 33 parts methyl methacrylate with a mixture of 33 parts methyl methacrylate and 3 parts ethyl acrylate provides a modifier with similar characteristics. The first modifier is indicated to be B/S/MMA//S//MMA and is designated Modifier C; the second modifier is B/S/MMA//S//MMA/EA and is designated Modifier D.

Modifier E

The modifier is prepared using the procedure utilized for Modifiers C and D except that the rubbery latex is prepared from the following monomer charge:

71 parts butadiene
29 parts styrene
2 parts methyl methacrylate

There is no intermediate stage polymer and the final stage monomer charge is replaced by 68 parts methyl methacrylate. This monomer charge is polymerized to physically and chemically attach to the latex particles using techniques well known in the art. The modifier is coagulated, washed and dried under vacuum and is indicated to be B/S/MMA//MMA and is designated Modifier E.

Resin X

Using the methods previously described poly (2,6-dimethyl-1,4-phenylene)ether is prepared such that the number of repeating units is greater than 100.

Resin Y

A blend is prepared of 50 parts Resin X, 35 parts polystyrene, and 15 parts butadiene/styrene copolymer.

EXAMPLE 2

Preparation of samples

The mixture of the dry components to be tested are blended on a 3-inch by 6-inch electrically heated roll mill with the front mill maintained at 550° F. and the back roll maintained at 250° F. The mixes are blended for five minutes after fluxing (usually about 3 to 5 minutes to flux.)

The compositions are removed from the mill granulated and injection or compression molded into test specimens. Depending upon the composition the injection cylinder temperature is varied from 490° F. to 610° F. and the mold temperature is varied from 160° F. to 250° F., while the ram is left unheated. The compression moldings are made with a 2 minute preheat and 2 minutes under 100 tons p.s.i. pressure at 500° F.

During processing a mixture of 50 parts Resin X and 50 parts Modifier B fails to flux on the mill and degradation of the polymer occurs. No usable compression moldings may be prepared. A mixture of 50 parts Resin X and 50 parts Modifier A fluxes within 3 to 5 minutes to produce satisfactory test samples. Typical values obtained from the sample include a Rockwell hardness of 30 ("L" scale) and a Vicat softening temperature of 129° C.

A mixture of 6.3 grams Modifier E and 25.2 grams Resin X are placed in a Brabender Plasti-Corder available from the C. W. Brabender Company to test the processing characteristics. The jacket temperature is maintained at 600° F., with a shear rate of 31.5 r.p.m. on a No. 6 Roller Mixer Measuring Head. Flux occurs within 3 minutes and a consistency of 1500 meter-grams of torque is reached at 595° F. This consistency is constant for more than 30 minutes indicating no degradation. A control run using only Resin X yields poor processing characteristics with severe degradation.

During injection molding of the mixes the processing information presented in Table I is typical:

TABLE I

| Composition | Temperature, °F. | | Oil pressure, p.s.i. | |
|---|---|---|---|---|
| | Cylinder | Block | ⅛" bar | ¼" bar |
| Resin X alone | 610 | 250 | 1,000 | 1,200 |
| 20% modifier E and 80% resin X | 550 | 250 | 800 | 900 |

EXAMPLE 3

Typical physical test results are provided in Table II using the following test procedures:

Izod impact strength _____ ASTM No. D256–56 Method A
Distortion temperature under load (DTUL) _____ ASTM No. D621–64
Hardness _____ ASTM No. D785–65
Micro tensile properties _____ ASTM No. D1708–66

TABLE II

| Composition | | Izod impact, ft.-lbs./inch of notch | Hardness (Rockwell L) | Heat distortion | | Micro tensile | | |
|---|---|---|---|---|---|---|---|---|
| Resin | Modifier—Amount | | | Vicat, °C. | DTUL 264 p.s.i., °C. | Percent elongation at breaking | Stress, max. p.s.i. | Modulus, p.s.i. |
| X | None | 0.9 | | 185 | 169 | 106 | 10,800 | 353,000 |
| X | D—20% | 2.3 | | 178 | 156 | 111 | 9,300 | 320,000 |
| Y | None | 2.4 | 66 | 129 | 112 | 100 | 8,280 | 350,000 |
| Y | C—20% | 5.1 | 29 | 133 | 119 | 95 | 6,800 | 285,000 |
| Y | A—20% | 0.6 | 23 | 133 | 115 | 41 | 7,050 | 300,000 |
| Y | E—20% | 1.0 | 29 | 136 | 115 | 63 | 7,130 | 286,000 |

What is claimed is:

1. A molding composition comprising 95 to 70 percent by weight of a polyphenylene ether resin and 5 to 30 percent by weight of a multiple-stage sequentially-produced polymer comprising (A) 20 to 80 weight percent of a first stage polymerized from a monomer mixture comprising at least 40 weight percent butadiene, (B) 10 to 40 weight percent of a second stage polymerized in the presence of the first stage from a monomer mixture comprising at least 50 weight percent styrene, and (C) 10 to 40 weight percent of a final stage polymerized in the presence of the product of the first and second stage from a monomer mixture comprising at least 75 weight percent of a monomer selected from the group consisting of alkyl methacrylate, alicyclic methacrylates, alkyl acrylates and mixtures of the foregoing.

2. The molding composition of claim 1 wherein the polyphenylene ether resin is represented by the formula

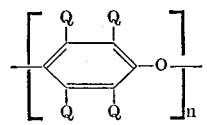

wherein Q is alkyl in the position ortho to the ether oxygen and is hydrogen in the position meta to the ether oxygen and $n$ is a positive integer greater than 100.

3. The molding composition of claim 1 wherein the polyphenylene ether resin comprises poly(2,6-dimethyl-1,4-phenylene)oxide.

4. The molding composition of claim 1 wherein the polyphenylene ether resin comprises 40 to 80% by weight poly(2,6-dimethyl-1,4-phenylene)oxide and 20 to 60% by weight of a styrene polymer.

5. The molding composition of claim 1 wherein the three-stage polymer comprises:
  (A) 20 to 80 weight percent of a first stage polymerized from a monomer mixture of butadiene or butadiene and styrene,
  (B) 10 to 40 weight percent of a second stage polymerized in the presence of the first stage from a monomer mixture of styrene, and
  (C) 10 to 40 weight percent of a final stage polymerized in the presence of the product of the first and second stages from methyl methacrylate or a monomer mixture of methyl methacrylate and ethyl acrylate.

References Cited

UNITED STATES PATENTS 3,383,340  5/1968  MacCallum et al. ____ 260—887
3,383,435  5/1968  Cizek _____ 260—874
3,288,886  11/1966  Himei et al. _____ 260—876

MURRAY TILLMAN, Primary Examiner

C. J. SECCURO, Assistant Examiner

U.S. Cl. X.R.

260—874, 880 R